Sept. 25, 1962     D. H. CRONQUIST     3,055,522
PICKUP DEVICE

Filed May 11, 1959     3 Sheets-Sheet 1

INVENTOR.
DONALD H. CRONQUIST
BY
Edward A. Robinson
ATTORNEY

Sept. 25, 1962   D. H. CRONQUIST   3,055,522
PICKUP DEVICE
Filed May 11, 1959   3 Sheets-Sheet 2

Sept. 25, 1962     D. H. CRONQUIST     3,055,522
PICKUP DEVICE

Filed May 11, 1959     3 Sheets-Sheet 3

United States Patent Office 3,055,522
Patented Sept. 25, 1962

3,055,522
PICKUP DEVICE
Donald H. Cronquist, Santa Clara, Calif., assignor to International Business Machines Corporation, New York, N.Y., a corporation of New York
Filed May 11, 1959, Ser. No. 812,415
8 Claims. (Cl. 214—309)

This invention relates to data storage, and more particularly to apparatus for storing and retrieving documents and the like in a storage bin.

In a copending patent application, Serial No. 786,406, filed January 12, 1969, and entitled, "Direct Access Photo Memory," wherein this applicant participated as a joint inventor, data is stored on film strips which are deposited and stored in bins or cells. To record data on or reproduce data from a selected film strip, or other document sheets, the film strip is mechanically moved from a stored position in the bin to an optical station. This invention concerns a similar machine wherein data strips are stored in a bin and mechanically selected and moved to an optical system.

It is an object of this invention to provide improved apparatus for mechanically engaging and gripping a selected document or film strip in a storage bin such that the selected document may be withdrawn from the bin.

A further object of this invention is to provide an improved jaw assembly having points for insertion into a bin at precise locations near an edge of the selected document such that the jaws may properly straddle opposite sides of the document regardless of the fact that the document may be warped or misshapened.

Another object of this invention is to provide improved jaws for insertion into a bin and for gripping a desired one of a plurality of stored document sheets therein; it being a further object to provide a blade-like leading edge for jaws which will separate the desired document sheet from adjacent document sheets in the bin and to provide a thickened shank portion for gripping the selected document sheet with sufficient mechanical force to permit rapid acceleration and transport thereof.

A further object of this invention is to provide an improved jaw assembly having a bi-stable mechanical means such that the jaws will remain in a stable opened position or in a stable closed position, and further providing separate jaw operating means positioned to open and close the jaws while the jaw assembly is positioned upon a storage bin.

Other objects of the invention will be pointed out in the following description and claims and illustrated in the accompanying drawings which disclose, by way of example, the principle of the invention and the best mode which has been contemplated of applying that principle.

Figure 1:
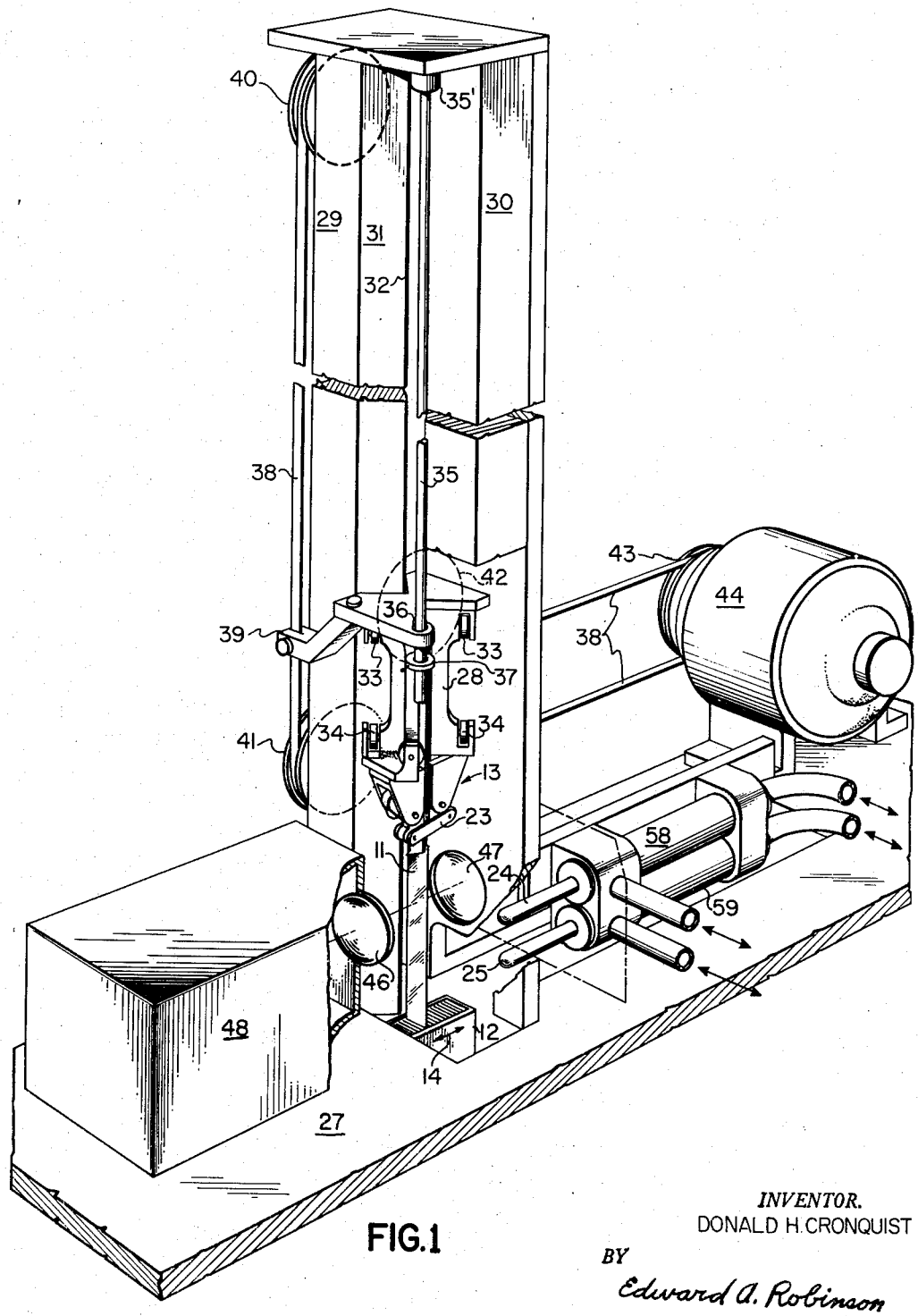
FIG. 1 is a perspective view of the document selection and retrieval apparatus of this invention.

Briefly stated, according to a preferred embodiment of this invention, a selected document sheet or film strip 11 is removed from a storage bin 12 by a jaw assembly 13. Selection of the strip is made by relative positioning of the bin 12 with respect to the jaw assembly 13 as indicated by the double arrows 14, FIG. 4. With the bin 12 positioned, the jaw assembly 13 may descend astraddle the selected film strip 11 such that jaws 15 and 16 will be on opposite sides of the strip 11. The forward or leading portion of each jaw will have a diagonally extending blade 17 terminating in a point 18 positioned near a side or edge of the film strip 11, which side or edge will be accurately positioned regardless of the possible warping or deforming of the film strip within the bin 12. Thus, the point 18 will descend in a space between film strips and as the jaws 15 and 16 continue to descend the blades 17 will separate the single selected film strip 11 from adjacent unwanted film strips 11', and permit a thickened gripping area of the jaws 20 to mechanically clamp upon and hold the selected strip, FIG. 6. The jaws are opened and closed by a pair of cams 21 and 22 which are mechanically coupled together by means such as a link 23. The cams 21 and 22 will secure the jaws either in a stable opened position or stable closed position and may be operated to change from one stable position to the other by a pair of push rods 24 and 25 positioned near the storage bin 12, FIG. 2 and FIG. 3.

As shown in FIG. 1 the data storage machine may include one or more cells 12 positionable below a base 27 which supports the strip pickup apparatus and optical equipment for recording data on and/or reproducing data from selected strips 11. This apparatus includes the jaw assembly 13 mounted on a carriage 28 which is movable vertically between a pair of spaced apart rails or ways 29 and 30, see FIG. 1. Each of the ways 29 and 30 present angular surfaces 31 and 32 for engagement with wheels or rollers 33 and 34 mounted and supporting the carriage 28.

A stopping or decelerating means for the carriage 28 includes a rod 35, attached to the frame of the machine through a dash pot 35', an arm 36 attached to the carriage 28, and a collar 37 attached to the rod 37 attached to the rod 35. As the carriage 28 descends the arm 36 slides along over the rod 35 and at the terminal portion of its stroke engages the collar 37. The rod 35 is thence permitted to move slightly under a restraining force exerted through the dash pot 35' which may include a piston within a cylinder having trapped air which must escape through restricted openings. Thus, the dash pot 35' permits the rod 35 to move downwardly slightly and exert a restraining force to cushion and stop the carriage 28.

The carriage 28 is driven along the vertical ways 29 and 30 by a drive tape 38 attached to a bracket 39 which is mounted on the carriage. The drive tape 38 is trained about pulleys 40 and 41 forming the upper and the lower ends of a vertical span, and about another pulley 42 which changes the tape direction and permits the tape to ultimately be trained about a pulley 43 of a drive motor 44, FIG. 1. Thus, it may be appreciated that rotation of the motor 44 will cause the carriage 28 to move vertically toward or away from the storage bin 12.

Data is recorded on or reproduced from a selected strip 11 by moving the carriage downwardly until the jaws of the assembly 13 enter the bin 12 and grasp the selected film strip 11. Thence, the carriage 28 moves upwardly carrying the selected film strip 11 between a pair of lenses 46 and 47 which may be considered as a part of an optical system within the housing 48. The carriage 28 may thence be stopped at a selected position thereby aligning a selected portion of the selected film strip 11 with the optical station for reproducing data. At the conclusion of the data operation the carriage 28 again moves downwardly and the jaws are opened to release the film strip 11. The film strip may have sufficient length such that various portions may be presented in alignment with the optical station 48 while at all times the lower extremity thereof may remain in the bin 12; and therefore, the act of returning the film strip to the bin may be simplified since no alignment of a guideway or positioning of the bin need be made.

Figure 4:
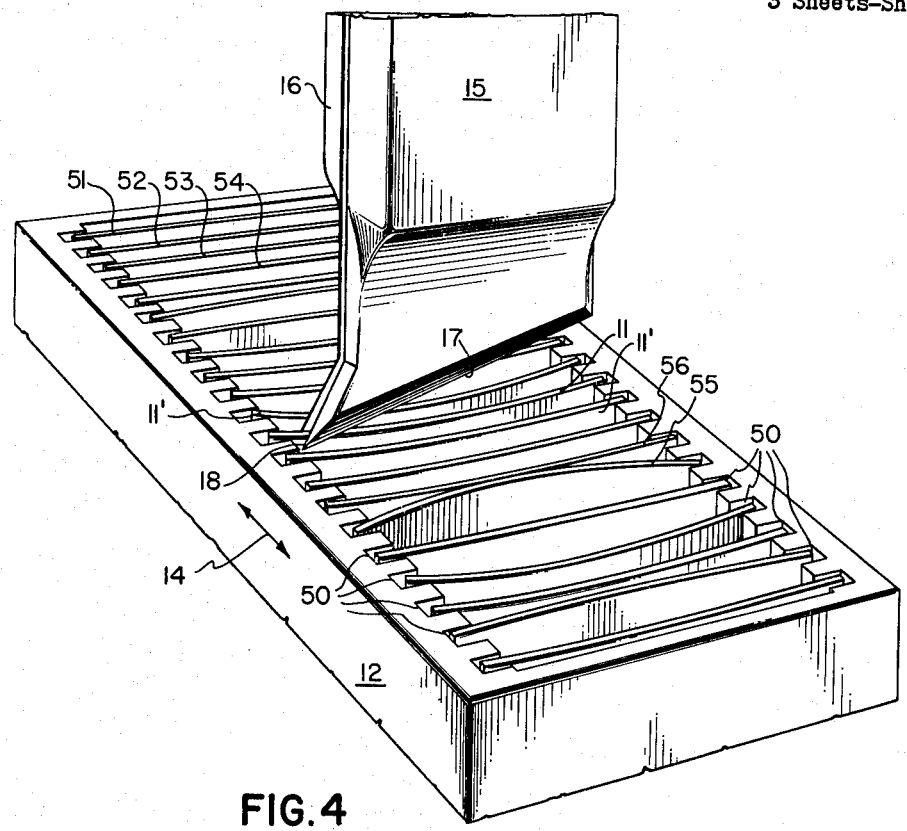
FIG. 4 is an enlarged perspective view of the forward ends or blades of the jaws being inserted into a bin for retrieval of a selected document sheet.
Figure 5:
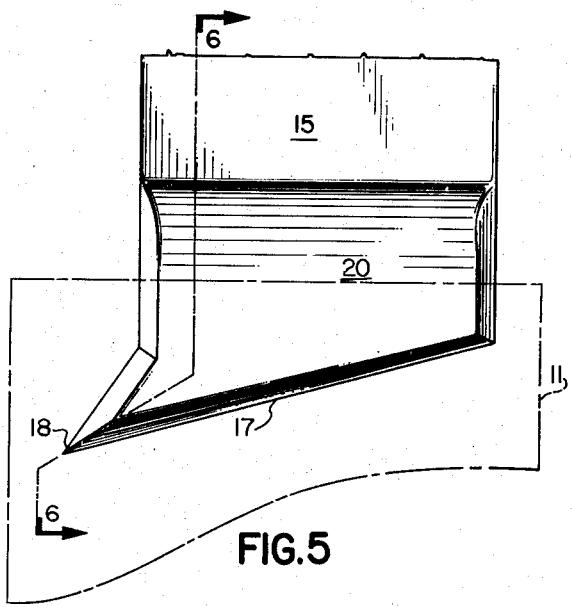
FIG. 5 is a front elevational view of a jaw blade which is shown further enlarged.

The manner in which the film strips or documents are positioned within a storage bin is best shown in FIG. 4 and it may be seen that opposite inner faces of the bin are formed in grooves 50 which are spaced apart as guideways for the individual document sheets or film strips. Ordinarily, it would be expected that the film strips are reasonably flat in character and would lie parallel to each other within their respective grooves or guideways 50 as specifically illustrated by the rearward group of film strips 51, 52, 53 and 54. If such were always the case, the shape of the forward portion of the jaws 15 and 16 would be relatively unimportant since a particular one of the film strips could be selected by merely positioning the jaw assembly thereover. However, it has been found that film strips have a tendency to cup or curl in a manner specifically illustrated by the particularly selected film strip 11 and the two film strips 11' immediately adjacent thereto. Normally, the curvature thus illustrated will be uniform and in the same direction, but it is possible that a particular film strip may be reversed and may have opposite curvature as best illustrated by a strip 55. In this event, the film strip 55 and the next adjacent film strip 56 may actually touch each other within the bin 12. With the film strips occupying possible arcuate positions within the bin, it is important that the jaws 15 and 16 have a means at the leading edge thereof for proper insertion astraddle the selected film strip, and to provide a proper separation between the film strips such that no film strip will be crushed beneath descending jaws.

As shown in FIG. 4 the forward or leading edge of the jaws 15 and 16 constitute the diagonal blade 17 which terminates in a point 18 positionable between adjacent grooves or guideways 50 and at the extreme side or edge of the selected film 11. Regardless of the deformation or curvature of the film strips within the cell 12, the point 18 of each jaw will not descend directly upon the film strip since the edge thereof is located precisely by the grooves or guideways 50. After the point 18 begins to descend within the cell or bin 12, the diagonal blade 17, which is somewhat rounded along its leading edge, will contact and straighten the film strips 11 and 11' and will ultimately separate the desired film strips 11 from the adjacent unwanted film strips 11'.

Figure 6:
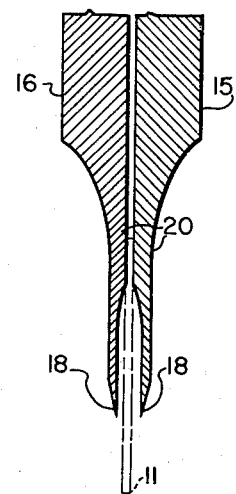
FIG. 6 is a section along the broken line 6—6 of FIG. 5.

As shown by FIG. 6 the forward edge of the point 18 and blade 17 is of reduced thickness to facilitate the insertion thereof between adjacent film strips of the bin 12, and therefore, the mechanical strength of the leading edges may not be sufficient to provide adequate gripping pressure between the jaws. Therefore, the jaws 15 and 16 will move downwardly until a thickened rearward portion 20 constituting a gripping area will be astraddle of the upper edge of the selected film strip 11. The jaws 15 and 16 may then be closed with sufficient mechanical force to secure the selected film strip therebetween, and to allow rapid accelerations and decelerations of the jaw assembly with the film strip secured thereto.

Figure 3:
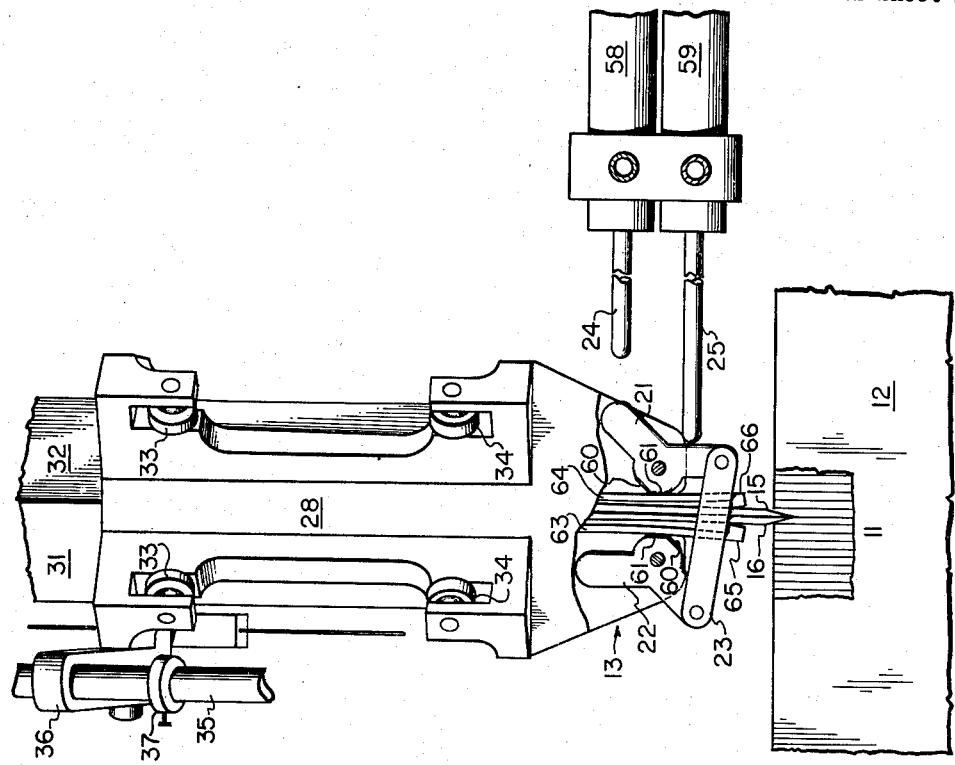
FIGS. 2 and 3 are similar vertical elevations with parts broken away illustrating the operation of the jaw assembly.
Figure 2:
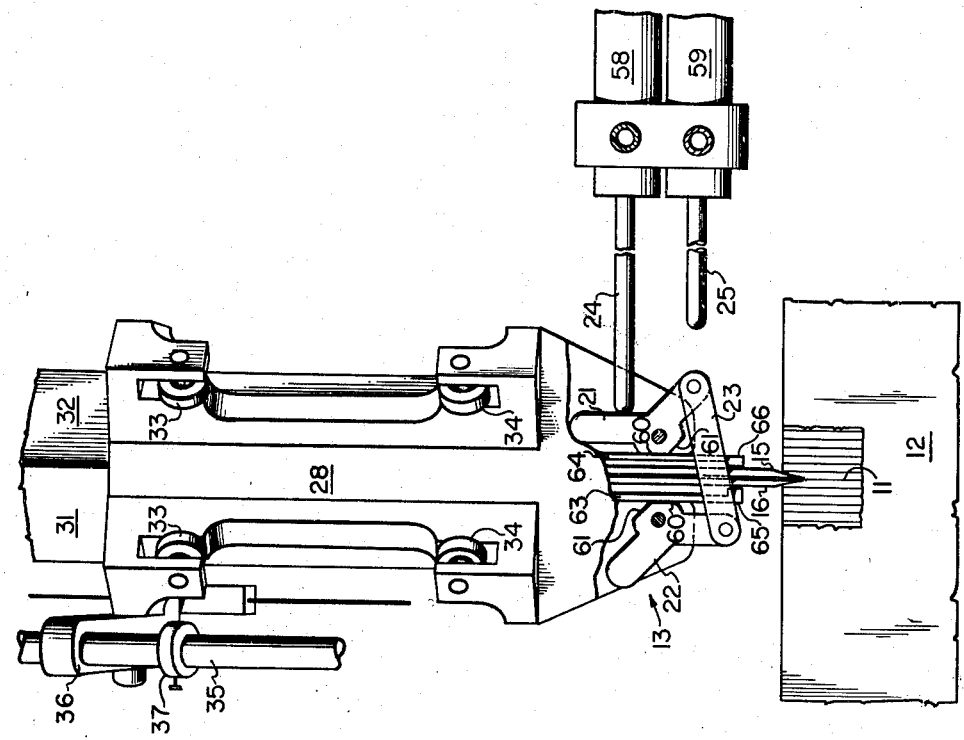

It may be appreciated that it is only necessary to open and close the jaws 15 and 16 at a time when the tips thereof are actually inserted into a bin 12. At all other times, the jaw assembly may move upwardly and downwardly along the ways 29 and 30 either with a selected film strip 11 secured therein or in an empty condition with no film strip therein. Therefore, a jaw closure means may be provided which is positioned in spaced relation over the bin 12. Such a jaw closure means may be a pair of hydraulic or pneumatic cylinders 58 and 59 with plungers or piston rods 24 and 25 extending therefrom. The jaw assembly 13 includes the pair of cams 21 and 22 mechanically coupled together by a link 23 and each having flattened surfaces 60 and 61 which operate to open and close the jaws. In FIG. 2 the jaws are shown in the opened position having been moved to such a position by the push rod or piston rod 24 which is driven into engagement with the cam 21 and causes the cam to rotate to present the flattened surfaces 60 allowing the jaws to open. FIG. 3, on the other hand, illustrates the jaws in the closed position wherein the lower push rod 25 has been driven against the cam 21 causing both cams 21 and 22 to rotate to the second flattened surface 61.

A cycle of operation may be initiated when the jaw assembly 13 moves downwardly causing the jaws 15 and 16 to move into the bin 12 astraddle of a selected film strip 11. The push rod 25 then engages and moves the cams 21 and 22 to a stable position wherein the jaws are closed upon the selected film strip 11. The carriage 28 is then moved upwardly carrying with it the jaw assembly 13 and the selected film strip 11 to a position in alignment with the optical system 48. At the conclusion of the recording or reproducing operation, the carriage 28 then moves downwardly until the leading edges of the jaws 15 and 16 are again within the bin 12, and the push rod 24 is operated to engage and move the cams 21 and 22 to the stable opened position thereby releasing the film strip 11. The carriage 28 is then moved upwardly a sufficient distance to permit the jaws 15 and 16 to clear the bin 12 whereupon a repositioning of the bin 12 may cause the selection of another film strip for a subsequent operation.

The jaw assembly 13 further includes a pair of resilient cam follower strips 63 and 64 which resiliently bear against the cams 21 and 22 and transmit a force to the jaws 15 and 16. The strips 63 and 64 extend along the jaw members 15 and 16, but turn inwardly at the lower extremity thereof to actually cause application of force against the jaw members at points 65 and 66. The strips 63 and 64 therefore provide the resilience necessary for permitting the cams 21 and 22 to rotate from one flat surface to another flat surface. In normal operation of this apparatus, the jaws are required to move only .002 inch to open and close on a film strip, but to be effective the cams 21 and 22 must vary their rise or spacement by at least .015 inch. The resilient strips 63 and 64, therefore, function to absorb a comparatively great cam movement while operating jaws have comparatively slight movement.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Document storage and retrieval apparatus comprising a bin and a pair of pickup jaws mounted in spaced relation with and movable toward the bin, said bin having spaced apart guideways for holding flexible document sheets, each of said jaws having a blade extending diagonally to the axis of movement of the jaws, each blade terminating in a point at one side of the jaws for making an initial entrance into the bin in spaces between selected guideways.

2. Document storage and retrieval apparatus comprising a bin having spaced guideways extending along internal sides thereof for holding individual flexible document sheets, a pair of jaws each having a diagonal leading edge terminating in a point, and drive means for positioning the jaws with the points adjacent to spaces at an edge of a selected document sheet and for thence moving the leading edges of the jaws into the bin astraddle the selected document sheet.

3. Document storage and retrieval apparatus comprising a bin having uniformly spaced guideways extending along opposed spaced internal walls thereof for holding individual flexible document sheets, and a pair of jaws mounted in spaced relation with and movable to the bin for grasping a selected document sheet, said jaws having diagonally extending blades each terminating in a point at one side thereof, said jaws being positionable with respect to the guideways whereby the points enter the bin in clear spaces at a side of the selected document sheet and whereby the blades separate the selected document sheet from other document sheets as the jaws are moved into the bin.

4. Document storage and retrieval apparatus comprising a bin having a means for holding flexible document sheets by opposite edges thereof, said document sheet edges being hold spaced apart from each other, a pair of jaws having pointed forward tips and gripping surfaces rearwardly of the tips, said jaws being mounted in spaced relation with the bin and movable there toward such that the tips enter the bin in spaces straddling one edge of a selected document sheet and such that the gripping surfaces locate on opposite sides of the selected document sheet, and jaw closure means positioned in spaced relation with the bin, the jaw closure means being operable to close and open the jaws to grip and release the selected document sheet.

5. Apparatus for storage and selective retrieval of film strips, said apparatus comprising a bin having spaced apart grooves extending along opposed spaced inner surfaces for holding opposite edges of the film strips, a pair of jaws mounted in spaced relation with and movable toward the bin, each of said jaws having a diagonal blade terminating in a pointed tip at one end thereof, and positionable drive means operatively associated with the jaws for locating the pointed tips adjacent to one of the grooved surfaces of the bin and in spaces on both sides of a selected one of the grooves, said jaws being movable into the bin to separate the film strip in the selected groove from other film strips in the bin.

6. Apparatus for pickup of a selected film strip from a storage bin, said apparatus comprising a jaw assembly movable to the storage bin, and jaw closure means positioned in spaced relation with the storage bin, said jaw assembly including a pair of film gripping members, and a pair of resilient sections operatively connected to the film gripping members, a pair of cams each pivotally mounted adjacent to one of the resilient sections, the resilient sections being operable to receive a comparatively large movement from the cam and to transmit a comparatively small movement to the corresponding film gripping member, and mechanical means coupled between the cams to pivot the cams in unison, said jaw closure means being operable to engage and move the cam members for opening and closing the jaw assembly.

7. Apparatus for pickup of a selected film strip from a storage bin, said apparatus comprising a jaw assembly movable into spaced relation with the storage bin, and a jaw closure means positioned in spaced relation with the storage bin, said jaw assembly including a pair of spaced apart film gripping members and a pair of resilient members operatively connected to the film gripping members, a pair of cams each pivotally mounted and positioned on opposite sides of the resilient members, the resilient members being operable to receive a comparatively large movement from the cam and to transmit a comparatively small movement to the corresponding film gripping members, and mechanical means coupled between the cams whereby the cams pivot in unison, each of said cams having a pair of flattened surfaces pivotal against the resilient members for providing a stable opened position and a stable closed position for the jaw assembly, said jaw closure means being operable to engage and move the cam members from one of the stable positions to the other stable position for opening and closing the jaws.

8. Apparatus for pickup of a selective document from a storage bin, said apparatus comprising a pair of parallel jaw members, a pivotally mounted cam adjacent each of the jaw members, each cam having two stable conditions for opening and closing the jaws, and a resilient element mechanically coupled between each cam and the corresponding jaw member, said resilient element being operable to receive a comparatively great movement from the cam and to transmit a comparatively slight movement to the corresponding jaw member.

References Cited in the file of this patent

UNITED STATES PATENTS

| | | |
|---|---|---|
| 436,730 | Wright | Sept. 16, 1890 |
| 759,365 | Geyer | May 10, 1904 |
| 1,021,723 | Morse | Mar. 26, 1912 |
| 1,069,666 | Bartholomew | Aug. 12, 1913 |
| 1,962,902 | Kunath | June 12, 1934 |
| 2,783,897 | Farquharson | Mar. 5, 1957 |
| 2,899,043 | Young | Aug. 11, 1959 |

FOREIGN PATENTS

| | | |
|---|---|---|
| 1,107,483 | France | Jan. 3, 1956 |